T. J. PRICE.
Evaporating Pan.
No. 34,264.
Patented Jan. 28, 1862.
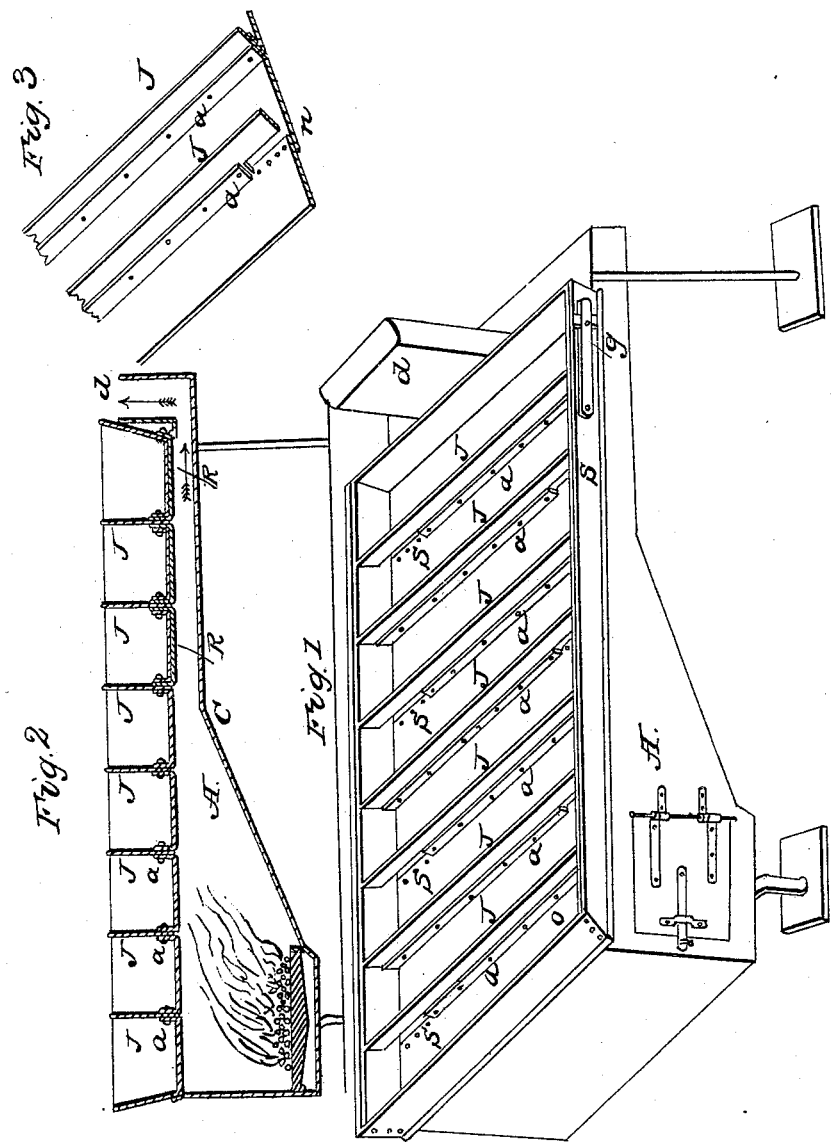

UNITED STATES PATENT OFFICE.

THOMAS J. PRICE, OF INDUSTRY, ILLINOIS.

IMPROVEMENT IN CONSTRUCTION OF EVAPORATING-PANS FOR SACCHARINE AND OTHER JUICES.

Specification forming part of Letters Patent No. 34,264, dated January 28, 1862.

*To all whom it may concern:*

Be it known that I, THOMAS J. PRICE, of Industry, in the county of McDonough and State of Illinois, have invented a new and useful Improvement in Evaporators for Saccharine and other Juices; and I do hereby declare that the following is a full, clear, and exact description of the same, reference being had to the accompanying drawings, making part of this specification, in which—

Figure 1 is a perspective view of the improved evaporator. Fig. 2 is a central longitudinal section of the same. Fig. 3 is a sectional perspective view illustrating the construction of bottoms of the pans.

My invention consists, first, in an improved manner of combining the partitions of the pan with the bottom of the same; second, in a combination of parts to provide for the circulation of the juice and prevent leakage; third, in an arrangement to govern the intensity of heat applied respectively to the front and rear divisions of the pan.

To enable others skilled in the art to make and use my invention, I will proceed to describe its construction and operation.

A represents a furnace extending beneath a number of the foremost divisons of the pans, and constructed with a throat, C, from whence the products of combustion are conveyed by a contracted passage to the flue $d$. The bottom B of each division of the pan is turned up at its edges, forming flanges $a$, which extend nearly across the pan.

J J are partitions extending completely from side to side, and secured between the vertical flanges $a$ by bolts or rivets. The partitions are secured at their ends to the sides of the pan by any suitable means. By slotting the lower edges of the partitions J at alternate ends, and overlapping the edges of the bottoms B in positions corresponding therewith, as shown at $a'$, openings S are formed alternately at opposite sides of the evaporator for the purpose of passing the juice gradually from pan to pan without scum. Between the overlapping edges $a$ a strip of painted canvas, $n$, or other suitable luting, is interposed to prevent leakage.

R R represent false bottoms, employed to prevent excessive heat in the divisions in which the final boiling is performed. $g$ is the outlet.

The operation is as follows: The saccharine juice is introduced to the pan at O, flowing across to the other side through the first aperture, S, thence throughout the length of the second division, and so on until it reaches the outlet $g$, by which time it is reduced to sirup. The partitions, extending completely across the pan, with apertures only at their lower edges, effectually prevent the passage of scum from one division to another.

The false bottoms R, when highly heated, expand downward so as to leave a body of air between them and the bottoms of the divisions in which the concentrated sirup is contained, thus effectually preserving both the pan and the sirup from scorching.

The luting $n$ prevents any danger of leakage, which might otherwise occur at the place where the edges of the plates overlap in a horizontal position.

By the represented form and arrangement of the furnace and flues, the products of combustion remain for a considerable period in contact with the divisions of the pan, imparting thereto a high degree of heat; but after passing the throat C the gases are rapidly carried off, acting with less intensity upon the divisions containing sirup in the later stages of evaporation.

The manner of attaching the partitions between flanges projecting upward from the bottom is of great importance to prevent warping, which frequently causes much inconvenience by separating the bottom from the partitions, and thus destroying the effect of the latter.

I am aware that it is not new to construct a saccharine evaporator with partitions extending completely across, and formed with apertures at opposite ends for the passage of the juice, and also that the bottoms of the pans have previously been provided with guards to protect them from too intense action of the fire.

What I claim as new, and desire to secure by Letters Patent, is—

1. An evaporator for saccharine or other juices, having partitions J extending from side to side, with openings at alternate ends, and secured by bolts or rivets between upturned flanges $a$ of the bottom plates, all as hereinbefore explained.

2. The combination of the vertical flanges

*a*, horizontal lapping edges *a'*, and painted canvas luting *n*, all arranged and employed in the manner and for the purposes hereinbefore explained.

4. The combined arrangement of the furnace A, contracted throat C, and guards R, applied to the rear divisions of the pan, all as herein shown and described, and for the purposes specified.

THOS. J. PRICE.

Witnesses:
JOHN REED,
WILLIAM SHERMAN.